US007701489B1

(12) United States Patent
Christie et al.

(10) Patent No.: US 7,701,489 B1
(45) Date of Patent: Apr. 20, 2010

(54) METHOD AND APPARATUS FOR COLOR CORRECTION

(75) Inventors: Greg Christie, San Jose, CA (US); Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 1044 days.

(21) Appl. No.: 10/446,413

(22) Filed: May 27, 2003

(51) Int. Cl.
H04N 9/73 (2006.01)
(52) U.S. Cl. ............... 348/224.1; 348/223.1; 348/225.1
(58) Field of Classification Search .............. 348/223.1, 348/224.1, 225.1, 360, 362, 336; 438/361; 396/432; 359/363, 889
See application file for complete search history.

(56) References Cited

U.S. PATENT DOCUMENTS

| 4,381,890 A | * | 5/1983 | Wallace ...................... 396/276 |
| 4,473,289 A | * | 9/1984 | Wallace ...................... 396/276 |
| 4,605,955 A | * | 8/1986 | Hashimoto et al. ........ 348/227.1 |
| 4,811,086 A | * | 3/1989 | Hieda ........................ 348/227.1 |
| 4,829,383 A | * | 5/1989 | Harase et al. .................. 348/64 |
| 5,016,091 A | * | 5/1991 | Choi ........................... 348/224.1 |
| 5,016,094 A | * | 5/1991 | Kaneko ...................... 348/226.1 |
| 5,045,928 A | * | 9/1991 | Takaiwa et al. ............ 348/227.1 |
| 5,070,407 A | * | 12/1991 | Wheeler et al. ............... 348/342 |
| 5,134,466 A | * | 7/1992 | Taek-hyun ................. 348/227.1 |
| 5,148,288 A | * | 9/1992 | Hannah ........................ 382/167 |
| 5,153,717 A | * | 10/1992 | Nitta ............................. 348/71 |
| 5,198,890 A | * | 3/1993 | Suga ......................... 348/227.1 |
| 5,294,989 A | | 3/1994 | Moore et al. |
| 5,434,958 A | | 7/1995 | Surma et al. |
| 5,504,525 A | * | 4/1996 | Suzuki ...................... 348/223.1 |
| 5,619,260 A | * | 4/1997 | Miyadera .................. 348/223.1 |
| 5,760,930 A | | 6/1998 | Fukuzawa et al. |
| 5,784,180 A | | 7/1998 | Sakai et al. |
| 5,883,973 A | | 3/1999 | Pascovici et al. |

(Continued)

FOREIGN PATENT DOCUMENTS

CN 1313004 A 9/2001

(Continued)

OTHER PUBLICATIONS

PCT International Report on Patentability and Written Opinion for PCT/US2005/035074, mailed Apr. 12, 2007, 12 pgs.

(Continued)

*Primary Examiner*—Sinh Tran
*Assistant Examiner*—Wanda M Negron
(74) *Attorney, Agent, or Firm*—Blakely, Sokoloff, Taylor & Zafman LLP

(57) ABSTRACT

Methods and apparatuses for color correction using diffusers. At least one embodiment of the present invention seeks to perform color correction using color signals detected for the light passing through a diffuser. While typically software-based color correction methods rely on predetermined assumptions about the properties of an image, such as the averaged and/or profiled color information, at least one embodiment of the present invention utilizes the color signals for the light passing through a diffuser to determine the properties of the lightening environment. Instead of depending on the predetermined assumptions about the lightening environment or the image of the scene, at least one embodiment of the present invention performs the color correction according to the color information detected for the actual lightening environment.

21 Claims, 8 Drawing Sheets

U.S. PATENT DOCUMENTS

| | | | |
|---|---|---|---|
| 5,926,218 A * | 7/1999 | Smith | 348/207.99 |
| 5,973,802 A | 10/1999 | Hirota et al. | |
| 6,038,339 A | 3/2000 | Hubel et al. | |
| 6,141,033 A | 10/2000 | Michael et al. | |
| 6,151,410 A | 11/2000 | Kuwata et al. | |
| 6,553,135 B1 | 4/2003 | Douglass et al. | |
| 6,771,272 B2 | 8/2004 | Deering | |
| 6,895,112 B2 | 5/2005 | Chen et al. | |
| 6,917,720 B1 | 7/2005 | Caesar et al. | |
| 6,985,628 B2 | 1/2006 | Fan | |
| 7,006,708 B1 | 2/2006 | Nako et al. | |
| 7,057,768 B2 | 6/2006 | Zaklika et al. | |
| 7,068,840 B2 | 6/2006 | Risson | |
| 7,184,080 B2 | 2/2007 | Kehtarnavaz et al. | |
| 7,257,251 B2 | 8/2007 | Matthews | |
| 2002/0005855 A1 | 1/2002 | Mehigan | |
| 2002/0044215 A1 * | 4/2002 | Takagi et al. | 348/374 |
| 2002/0130959 A1 * | 9/2002 | McGarvey | 348/223 |
| 2002/0141638 A1 | 10/2002 | Lee et al. | |
| 2002/0196335 A1 | 12/2002 | Ozawa | |
| 2003/0156752 A1 | 8/2003 | Turpin et al. | |
| 2003/0179926 A1 | 9/2003 | Yamazoe et al. | |
| 2004/0125215 A1 * | 7/2004 | Wallace | 348/223.1 |

FOREIGN PATENT DOCUMENTS

| | | |
|---|---|---|
| EP | 1107176 A | 6/2001 |
| EP | 1289269 A | 3/2003 |
| EP | 1292112 A1 | 3/2003 |

OTHER PUBLICATIONS

PCT International Search Report and Written Opinion for PCT/US2005/035074, mailed Apr. 25, 2006, 19 pgs.

PCT Invitation To Pay Additional Fees for PCT/US2005/035074, mailed Feb. 13, 2006, 6 pgs.

Jan Esmann, "PR Studio-Black & White-1.0-Userguide", Copyright 2003.

Luminance Models for Grayscale Conversions, Gernot Hoffman.

Centre for Systems Science, Simon Fraser University, "Colour Constancy Algorithms", 10 pages, 1999.

Charles Rosenberg, "Image Color Constancy Using EM and Cached Statistics", *ICML00*, Palo Alto, CA, 8 pages, 2000.

Kobus Barnard, "Modeling Scene Illumination Colour for Computer Vision and Image Reproduction: A survey of computational approaches". Computing Science at Simon Fraser University, 39 pages, Dec. 1998.

Graham D. Finlayson, et al., "Comprehensive Colour Image Normalization", 16 pages, Jun. 1998.

Ron Gershon, et al., "From [R, G, B] to Surface Reflectance: Computing Color Constant Descriptors in Images", IJCAI, Milan, 7 pages, 1987.

* cited by examiner

METHOD AND APPARATUS FOR COLOR CORRECTION

FIELD OF THE INVENTION

The invention relates to color correction, and more particular to color correction for image sensing devices.

BACKGROUND OF THE INVENTION

The color of a light-reflecting object changes as the color of the lightening environment changes. For example, a white table, which is white under a standard lightening condition, appears red when it is illuminated with a light source of red.

Digital cameras (e.g., digital still cameras and digital video cameras) have been developed to capture images. The digital data from the digital cameras can be manipulated using software programs (or, hardware circuits) for image enhancement and color corrections.

Typical software-based color correction schemes use the statistic properties of the image colors of a scene to perform color correction. For example, it may be assumed that when averaged the image of a scene is chromatically white. Thus, when the statistic average of the image of the scene is not white, color correction can be performed so that, after the correction, the statistic average of the image of the scene is white.

SUMMARY OF THE DESCRIPTION

Methods and apparatuses for color correction using diffusers are described here. At least one embodiment of the present invention seeks to perform color correction using color signals detected for the light passing through a diffuser. While typically software-based color correction methods rely on predetermined assumptions about the properties of an image, such as the averaged and/or profiled color information, at least one embodiment of the present invention utilizes the color signals for the light passing through a diffuser to determine the properties of the lightening environment. Instead of depending on the predetermined assumptions about the lightening environment or the image of the scene, at least one embodiment of the present invention performs the color correction according to the color information detected for the actual lightening environment.

In one aspect of the present invention, an imaging device (e.g., a still image camera or a video camera) includes: a housing; an image sensor (e.g., CMOS (Complementary Metal-Oxide Semiconductor) or CCD (Charge Coupled Device) based image sensor), a lens and a diffuser (e.g., a translucent flat or dome member of a uniform color) coupled to the housing; where, the lens is in front of the image sensor to generate an image of a scene on the image sensor; the diffuser is at a first position relative to the housing and in front of the image sensor to diffuse light towards the image sensor; the diffuser is movable to a second position relative to the housing so that the diffuser does not obstruct the lens in generating the image of the scene on the image sensor; and, the image sensor generates color signals for determining color correction information as a result of light passing through the diffuser. In one example, the imaging device further includes a switch coupled to the diffuser and the housing; the switch is in a first state when the diffuser is at the first position and in a second state when the diffuser is at the second position; and, the image sensor generates the color signals for determining the color correction information when the switch is in the first state. In one example, the image device further has a circuit coupled to the image sensor for determining the color correction information using the color signals that are generated by the image sensor when the diffuser is in the first position to diffuse light; and, the circuit performs color correction using the color correction information for image signals generated by the image sensor when the switch is in the second state. In one example, the diffuser is translucent and of a known color; the color correction information is determined using the color signals and the known color of the diffuser; the color correction information is used for white balance; and, the color correction information is determined based on the scene being captured (e.g., a still photograph or a movie). In one example, the color correction information is determined using the color signals and recorded color signals, where the recorded color signals are generated by the image sensing device in a reference lightening environment when the diffuser is in the first state (diffusing light into the lens). In another example, the color correction information is determined using the color signals and predetermined color information. In one example, the circuit is integrated with the image sensor on a chip. In one example, the diffuser is integrated with a cover member which covers the lens for protection when the diffuser is at a third position relative to the housing; and, the diffuser is slidable to one of the first, second and third positions. In one example, the diffuser is in front of the lens when in the first position.

In one aspect of the present invention, a method to perform color correction includes: receiving first color signals for light passing through a translucent diffuser; and, determining color correction information for a first lightening environment using the first color signals; where the first color signals are determined by an image sensing device in the first lightening environment. In one example, after second color signals determined by the image sensing device in the first lightening environment are received, color correction is performed to the second color signals using the color correction information. In one example, the first color signals is automatically determined when the translucent diffuser is in a first position to diffuse light towards the image sensing device; and, the color correction is performed automatically when the translucent diffuser is in a second position to avoid obstructing light toward the image sensing device. In one example, the color correction information is determined using the first color signals and a known color of the translucent diffuser; and, in another example, the color correction information is determined using the first color signals and third color signals, where the third color signals for light passing through the translucent diffuser are determined by the image sensing device in a second lightening environment (e.g., a standard or a reference lightening environment).

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to an or one embodiment in the present disclosure are not necessary to the same embodiment; and, such references means at least one.

Figure 1:
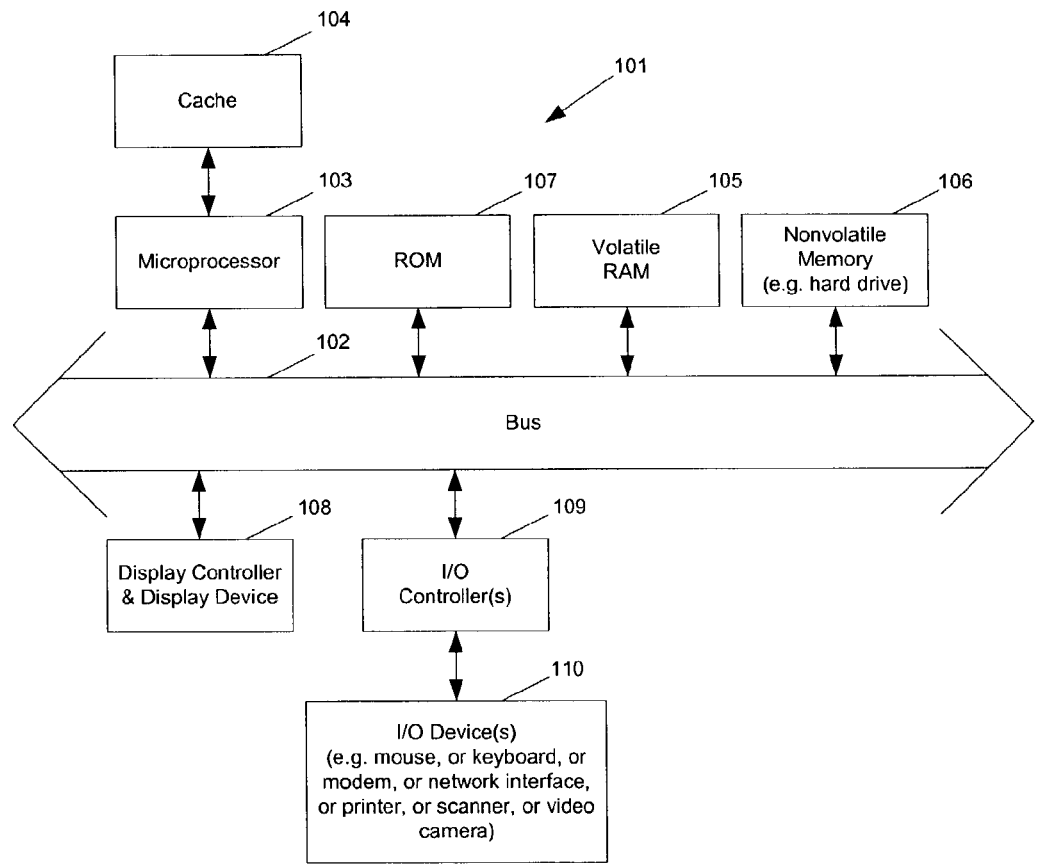
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art.

In one embodiment the I/O controller 109 includes a USB (Universal Serial Bus) adapter for controlling USB peripherals, and/or an IEEE-1394 bus adapter for controlling IEEE-1394 peripherals, such as a digital camera having an IEEE-1394 compatible port.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

At least one embodiment of the present invention seeks to perform color correction using color signals detected for the light passing through a diffuser that is attached to the imaging device. Conventional software-based color correction methods rely on predetermined assumptions about the properties of an image (such as the averaged and/or profiled color information) to perform the color correction. However, these assumptions may not be correct, accurate or desirable. At least one embodiment of the present invention utilizes the detected color information of the light passing through the diffuser to determine the properties of the lightening environment. Instead of depending on the predetermined assumptions about the lightening environment or the image of the scene, at least one embodiment of the present invention performs the color correction according to the color information detected for the light source in the actual lightening environment.

One embodiment of the present invention uses a physical diffuser of a known color with a digital camera. The diffuser slides (e.g., automatically or manually) over the lens once the camera is turned on. The image sensor captures the color signals for the surrounding light passing through the diffuser. Since the captured color signal contains the information of the color of the light source of the current environment, the captured color signals can be used for adjusting the white balance (e.g., by comparing the captured color signals with the corresponding signals of the known color, or the color signals of the light passing through the diffusers in a reference lightening environment for calibration). The diffuser is moved out of the way during the capturing of the image of a scene; and, color correction for the captured image of the scene is performed using the color signals for the light passing through the diffuser based on the light in the scene being captured.

In one embodiment of the present invention, a white translucent flat diffusing disc is shipped as a part of the camera. The diffusing disc is attached to the mechanism used to open and close the camera lens. When the lens is opened, the diffusing disc slides into the place ahead of the lens; and, the camera sends a signal to capture color signals for adjusting the white balance. The diffusing disc ahead of the lens diffuses the surrounding light coming towards the camera. No detail of the scene passes the diffusing disc. However, the light passing through the diffusing disc has the color cast information about the lightening environment. The color cast information can be determined from comparing the color of the light passing through the diffusing disc and the known color of the disc. Alternatively, the camera can record the color of the light passing through the diffusing disc in a standard or reference lightening environment (e.g., in a preferred lightening environment of a user, or in a calibration environment during the testing phase of the camera before the camera is shipped for sale, or others); and, the recorded color in the standard or reference environment can be used as a reference to determine the color cast information of the current lightening environment with respect to the standard or reference environment. In one embodiment of the present invention, the camera (or the calibration software) stores the colors of the diffuser in a number of different reference environments; and, the user can select one from the reference environments and calibrate the images captured in the current environment according to the selected reference environment. The color cast information (or color correction information) can be determined at a desired level of granularity (e.g., pixel by pixel, or block by block). The diffuser disc slides out of the way to finish the operation of opening the lens; and, the camera is then used in a normal mode for capturing images. The captured images are corrected according to the color cast information.

In one embodiment of the present invention, a user can also re-adjust the color balance (or, re-calibrate the color cast information) by choosing an adjustment function (e.g., using a button on the camera, or an input to a software application) to instruct the camera to position the diffusing disc ahead of the lens and capture the color cast information. Alternatively, a diffusing disc is moved manually to the position ahead of the lens to capture the color cast information.

Conventional software-based color correction schemes average and profile color information of the image of a scene. The averaged values may be corrected to an assumed value. However, there is no guarantee that the assumed values are correct. These conventional color correction schemes are highly dependent on the overall color balance of a particular scene. No neutral standard is used for comparison in these conventional color correction schemes. At least one embodiment of the present invention uses a physical diffuser of a known color as a neutral reference for color correction. According to one embodiment of the present invention, the color correction is performed before the captured images of a scene are transmitted (e.g., from the camera to a computer, or from a host computer of a video camera to a remote client). Thus, the received images will not have undesirable color shifting.

Figure 2:
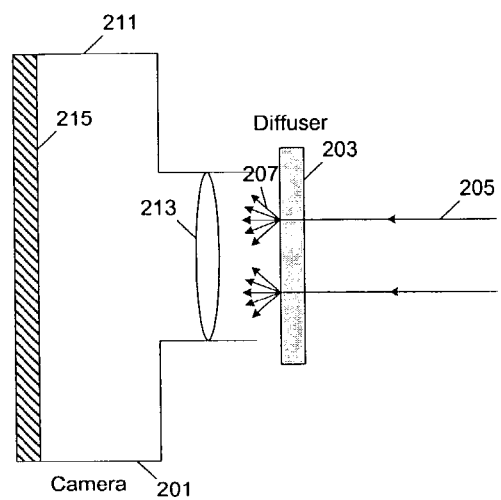
FIG. 2 shows an example of an imaging device with a diffuser for detecting color correction information for a lightening environment according to one embodiment of the present invention.

FIG. 2 shows an example of an imaging device with a diffuser for detecting color correction information for a lightening environment according to one embodiment of the present invention. In FIG. 2, diffuser 203 is in front of lens 213 and in the path of the surrounding light coming towards the image sensing device (215) of camera 201. Housing 211 of camera 201 provides shielding so that the light can reach the image sensing device 215, which may be a CCD (Charge Coupled Device) or a CMOS (Complementary Metal-Oxide Semiconductor) based image sensor, only through lens 213. Diffuser 203 is translucent so that light (e.g., 205) is scattered (207) in different directions after passing through the diffuser. The diffuser has a color (e.g., white) under a standard (or a reference) lightening condition; and, the color of the light passing through the diffuser and reaching the image sensing device is known in the standard lightening condition. When the camera is used in the current lightening condition, the color of the light passing through the diffuser and reaching the image sensing device can be compared to that in the standard lightening condition to determine the color cast information of the current lightening condition with respect to the standard one. Color correction can then be performed for the images taken in the current lightening conditions to account for the color cast of the light source.

Figure 3:
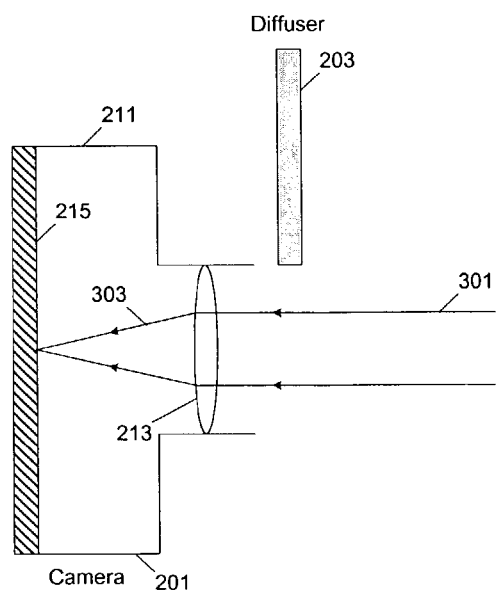
FIG. 3 shows an example of an imaging device with a diffuser moved out of the way for capturing the image of a scene according to one embodiment of the present invention.

FIG. 3 shows an example of an imaging device with a diffuser moved out of the way for capturing the image of a scene according to one embodiment of the present invention. During the capturing of the image of a scene, diffuser 203 is out of the way of the light (e.g., 301) coming from the scene to image sensing device 215. Thus, the light passes through lens 213 to generate the image of the scene on the light sensing device without going through the diffuser. Lens 213 generates a sharp image of the scene on the image sensing device (e.g., a CMOS (Complementary Metal-Oxide Semiconductor) or a CCD (Charge Coupled Device) based image sensor). The color cast information and the captured images can be transferred into a data processing system (e.g., system 101 of FIG. 1) for color correction. Alternatively, a microprocessor in camera 201 can be used to perform the color correction. For example, a processor integrated with the CMOS image sensor (e.g., on a same chip, or different chips) can be used to perform the color correction before the corrected image is transmitted to a data processing system.

Figure 4:
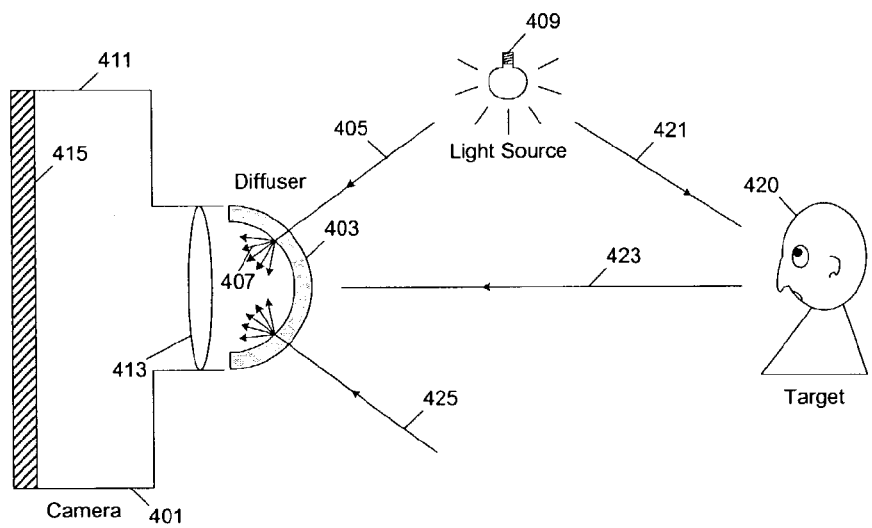
FIG. 4 shows another example of an imaging device with a diffuser for detecting color correction information for a lightening environment according to one embodiment of the present invention.

FIG. 4 shows another example of an imaging device with a diffuser for detecting color correction information for a lightening environment according to one embodiment of the present invention. In FIG. 4, dome-shaped diffuser 403 is in the path of the light coming towards the image sensing device (415). The diffuser scatters the light from the scene target (420), as well as the light directly from light source 409 and the light (e.g., 425) from other sources (or light reflecting objects). The diffuser scatters the surrounding light towards the image sensing device to illuminate the image sensing device with the light of the color of the diffuser under the current lightening condition (provided by the surrounding light coming towards the diffuser). The color signals generated by the image sensing device for the light of the color of the diffuser under the current lightening condition can be compared to the color of the diffuser under the standard lightening condition (or a reference lightening condition) so that the color cast of the light source on the image of a scene can be corrected accordingly.

Figure 5:
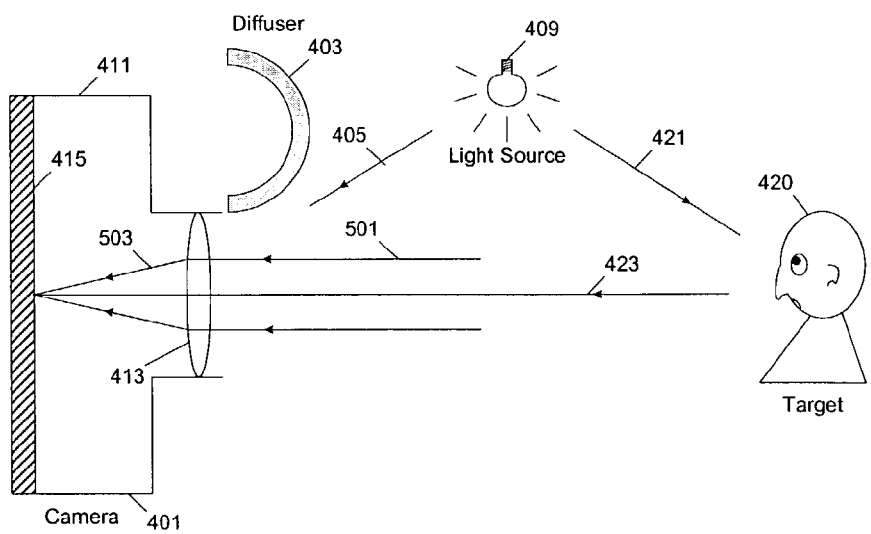
FIG. 5 shows another example of an imaging device with a diffuser moved out of the way for capturing the image of a scene according to one embodiment of the present invention.

FIG. 5 shows another example of an imaging device with a diffuser moved out of the way for capturing the image of a scene according to one embodiment of the present invention. In FIG. 5, diffuser 403 is outside the path of the light (e.g., 423, 501, 503) from the target scene (420), through lens 413, to the image sensing device (415). Assuming that the lightening condition causes the same or similar color shifting in the image of the target scene as in the color of the diffuser, the color signals of the light passing through the diffuser can be used to correct the color shift of the image of the target scene.

Although, the examples in FIGS. 2-5 illustrate a camera with a lens, it is understood that a set of lens can also be used instead. The camera can be a still image digital camera or a video camera. In alternative embodiments, the image sensing device is a film, which is exposed, developed, scanned and digitized to generate color signals. In another embodiment, separate image sensors are used for capturing the image of a scene and for sensing the light coming through the diffuser. In other words, a diffuser which is not moveable is positioned in front of a first image sensor (e.g., first CCD) in order to provide diffused light from a scene to determine the color cast of the scene; and, a lens without a diffuser is positioned in front of a second image sensor (e.g., a second CCD) which is used to capture light from the scene in order to record an image (e.g., "picture" or "photograph") of the scene. When different image sensors are used for the capturing of images and the sensing of lightening conditions, the determination of the color cast information can be performed concurrently (or substantially simultaneously) with the capturing of the image of the scene. Further, when different image sensors are used, the diffuser can be fixedly coupled with one of the image sensors; and, no lens is necessary between the diffuser and the corresponding sensor. From this description, a person skilled in the art understands that various modifications and alternatives can be constructed in a similar fashion.

Figure 6:
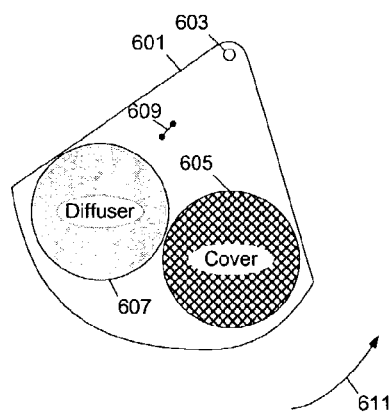
FIGS. 6-8 shows an example of an assembly with component members at various relative positions for automatic color correction according to one embodiment of the present invention.
Figure 7:
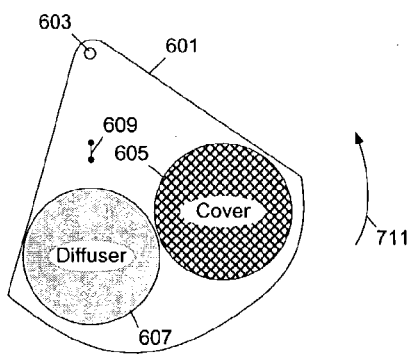
Figure 8:
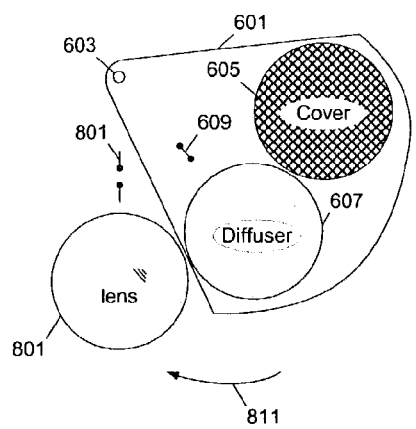

FIGS. 6-8 shows an example of an assembly with component members at various relative positions for automatic color correction according to one embodiment of the present invention. In FIG. 6, the assembly is in a position where cover member 605 is in front of the lens (see lens 801 in FIG. 8) to provide protection for the lens. Diffuser member 607 and cover member 605 are mounted on (or integrated with) supporting member 601, which is rotatably attached to the housing of the camera (not shown). When supporting member 601 is rotated about pivot 603 in direction 611, diffuser member 607 is brought in front of the lens. In FIG. 7, the diffuser member is in front of the lens, scattering the surrounding light towards the image sensor (e.g., 215 in FIG. 3 or 415 in FIG. 4) to so that color signals representing the color of the diffuser under the current lightening condition can be detected. When supporting member 601 is further rotated in direction 711, lens 801 is revealed for taking pictures of the scene. In FIG. 8, the diffuser and the cover members (607 and 605) slide aside to avoid obstructing the light path for capturing the images of the scene. In one embodiment of the present invention, a switch (801 and 609) that is coupled to the housing of the camera and the supporting member (601) is used to activate the calibration operation. When the supporting member is at the position in FIG. 7, the switch is turned on; and, the image sensing device is instructed to generate color signals for determining the color cast information of the current lightening condition. When the supporting member is away from the position as shown in FIG. 7, the switch is open; and, the camera is instructed to perform color correction using the determined color cast information. When the supporting member slides along direction 811 to the position in FIG. 7, the camera is instructed to re-capture the color of the diffuser and re-generate the color casting information (or the color correction information). In one embodiment of the present invention, the operation of the supporting member is automated so that when a user press a button of a camera, or a button of a software application that controls the camera, or a command received through a voice recognition system, the supporting member is moved to one of the positions in FIGS. 6-8.

FIGS. 6-8 illustrates one example assembly. From this description, a person skilled in the art can envision various alternative assemblies. For example, a diffuser member can be mounted on a strip of supporting members, slidable along a path. The diffuser member can be a part of a cover, movable between the position to obstruct the lens and the position to avoid obstructing the lens. Further, a diffuser can be fixedly integrated with a miniature light sensor which is dedicated for determining the lightening environment and which is separated from the image sensing device behind the lens.

Figure 9:
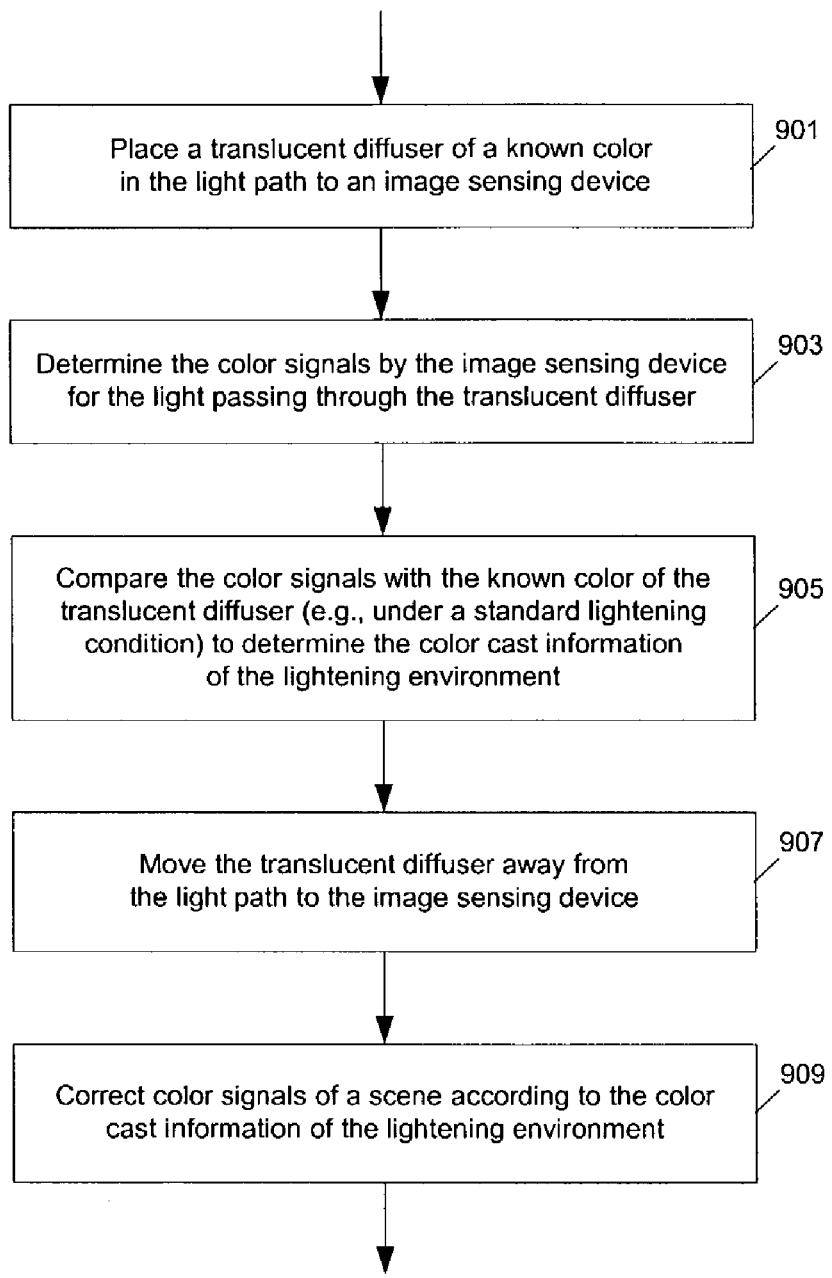
FIG. 9 shows a flow chart of a method to perform color correction according to one embodiment of the present invention.

FIG. 9 shows a flow chart of a method to perform color correction according to one embodiment of the present invention. All of the operations of FIG. 9 may, in one embodiment, be preformed in an imaging device (such as a digital camera); and, in another embodiment, some of the operations of FIG. 9 may be performed in an imaging device and the remainder may be performed in a general purpose computer (e.g., see FIG. 1), or a special purpose computer (e.g., a photo printer having a processor and user input controls and a port for receiving data from an imaging device. In operation 901, a translucent diffuser of a known color (e.g., white) is placed in the light path to an image sensing device. The diffuser scatters the light so that no image of a scene can be formed. The color of the light passing through the diffuser represents the color of the diffuser. The color signals are then determined by the image sensing device for the light passing through the translucent diffuser in operation 903. The determined color signals represent the color of the diffuser in the current lightening condition. In operation 905, the color signals are compared with the known color of the translucent diffuser (e.g., the color of the diffuser in a standard lightening condition) to determine the current color cast information of the current lightening environment. After the calibration, the translucent diffuser is moved away from the light path to the image sensing device (operation 907). Without the diffuser obstructing the light path, the image of a scene can be taken in a normal mode. After an image of a scene is captured, operation 909 corrects color signals of the scene according to the color cast information of the lightening environment. For example, after the color correction, an object of the known color of the diffuser (e.g., white) in the scene, under the current lightening environment which may have a color shift (e.g., reddish), has the same known color (e.g., white) of the diffuser in the corrected image; and, without the correction the object has a color shift (e.g., reddish) due to the color shift in the light source in the current environment.

Figure 10:
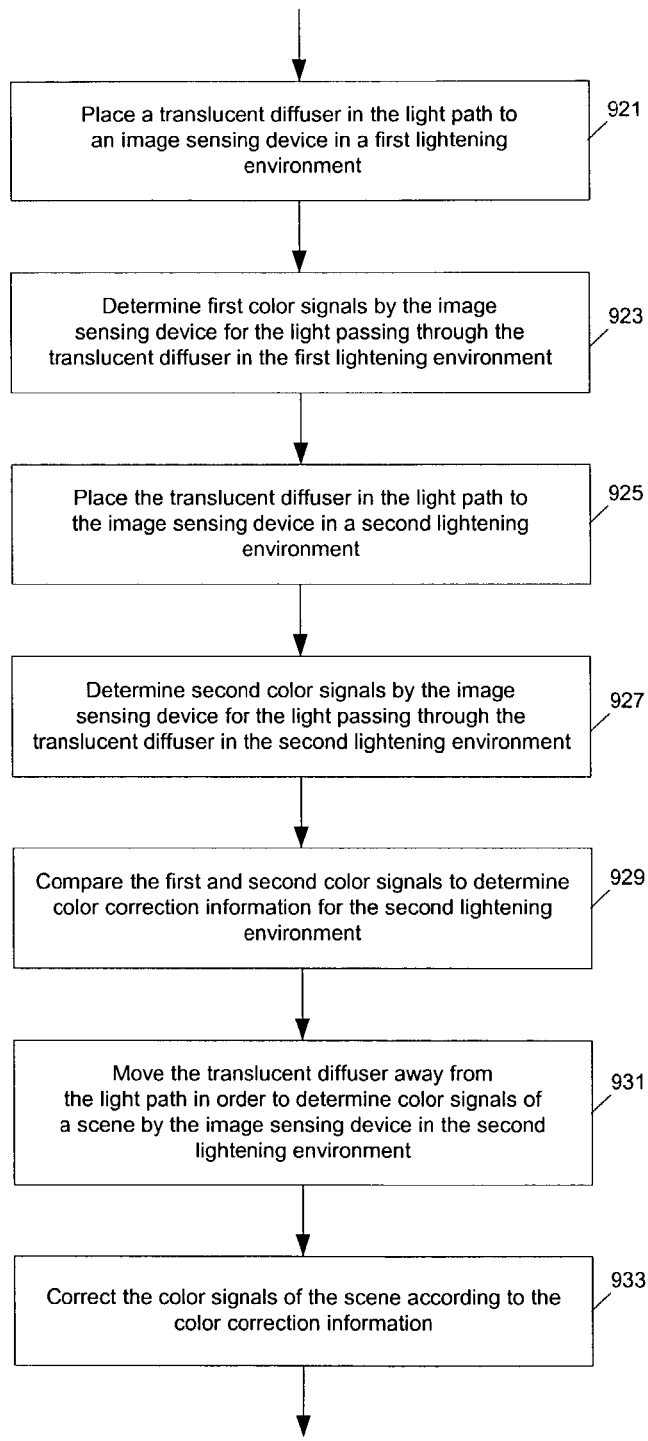
FIG. 10 shows another method to perform color correction according to one embodiment of the present invention.

FIG. 10 shows another method to perform color correction according to one embodiment of the present invention. All of the operations of FIG. 10 may, in one embodiment, be preformed in an imaging device; and, in another embodiment, some of the operations of FIG. 10 may be performed in an imaging device and the remainder may be performed in a general or special purpose computer. In this embodiment, a user may use the color of the diffuser in a reference environment, determined by the image sensing device with the diffuser in front of it, to establish the neutral reference for performing color correction. For example, a user may use the color of the diffuser in the outdoor daylight condition as a reference point and correct the color of the diffuser under the indoor incandescent (or fluorescent) light illumination. In operation 921, a translucent diffuser is placed in the light path to an image sensing device in a first lightening environment (e.g., the outdoor daylight condition). Then, first color signals are determined by the image sensing device for the light passing through the translucent diffuser in the first lightening environment in operation 923. The first color signals represent the color of the diffuser in the first lightening environment (e.g., the outdoor daylight condition). The first color signals are saved as the reference signals. In operation 925, the translucent diffuser is placed in the light path to the image sensing device in a second lightening environment (e.g., the indoor incandescent illumination). Second color signals are determined by the image sensing device for the light passing through the translucent diffuser in the second lightening environment in operation 927. The difference between the first and second color signals indicates the shift in color in lightening condition. Operation 929 compares the first and second color signals to determine color correction information for the second lightening environment. Thus, the color correction information can be used to correct the second color signals back to the first color signals; and, the color of the diffuser appeared in the second environment can be corrected back to the color of the diffuser in the first environment. The translucent diffuser is then moved away from the light path (e.g., automatically or manually) in order to determine color signals of a scene by the image sensing device in the second lightening environment in operation 931. The image of the scene can then be taken without the diffuser obstructing the light path. Operation 933 corrects the color signals of the scene according to the color correction information. Note that one can also associate the color signals of the diffuser with the images taken in the corresponding environment and later select (or capture) the preferred color signals of the diffuser (e.g., appears in a preferred environment) to perform the color correction.

Figure 11:
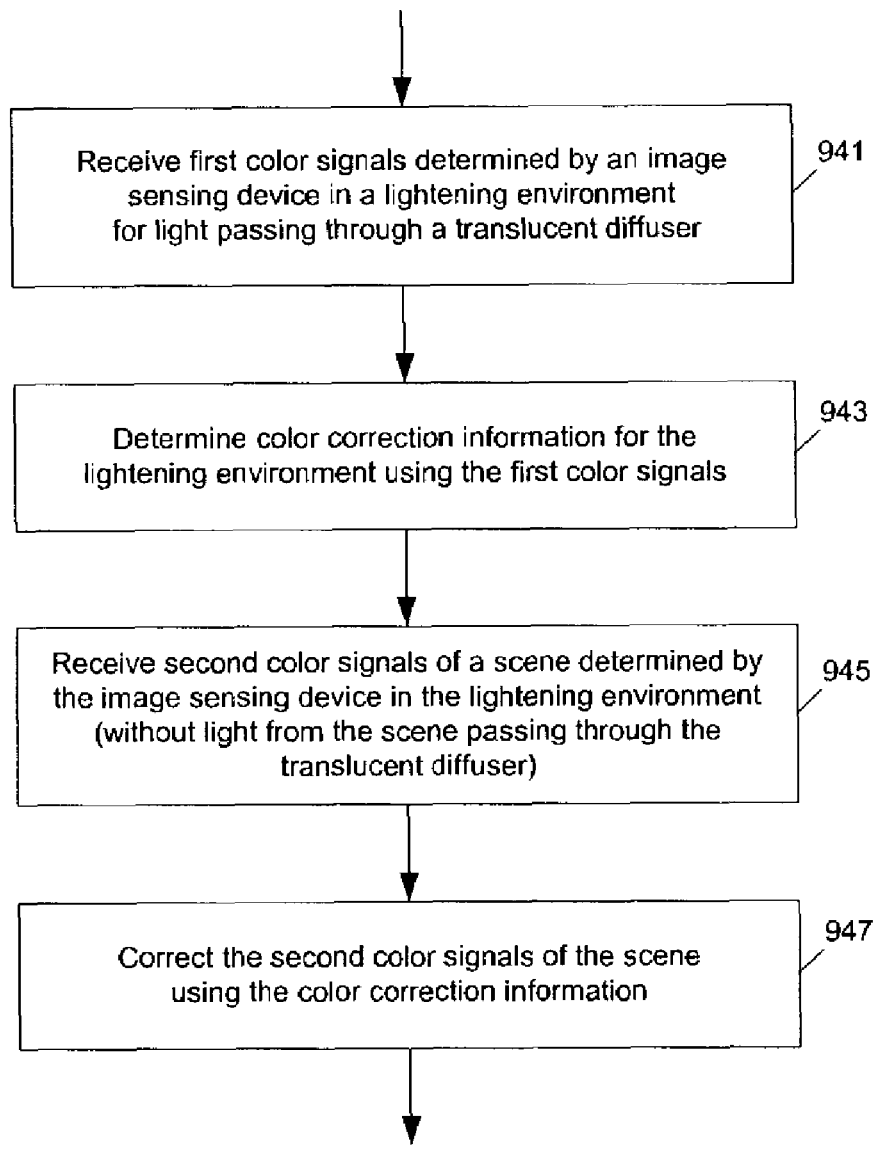
FIG. 11 shows an automated method to perform color correction using a diffuser according to one embodiment of the present invention.

FIG. 11 shows an automated method to perform color correction using a diffuser according to one embodiment of the present invention. All of the operations of FIG. 11 may, in one embodiment, be preformed in an imaging device; and, in another embodiment, some of the operations of FIG. 11 may be performed in an imaging device and the remainder may be performed in a general or special purpose computer. Operation 941 receives first color signals determined by an image sensing device in a lightening environment for light passing through a translucent diffuser. Operation 943 determines color correction information for the lightening environment using the first color signals. The color correction information can be determined with respect to the known color of the diffuser, or reference color signals of the light passing through the diffuser in reference environments. Operation 945 receives second color signals of a scene determined by the image sensing device in the lightening environment (without light from the scene passing through the translucent diffuser). Operation 947 corrects the second color signals of the scene using the color correction information.

In one embodiment of the present invention, the color signal of the light passing through the diffuser when the diffuser is in front of the image sensor (and the lens) is subtracted from the known color signal of the diffuser under the standard (or reference) lightening condition to determine the amount of color correction; and, the image data generated by the image sensor for a scene is then added with the amount of color correction. For example, if the RGB value of the color of the diffuser under a standard lightening condition is (128, 128, 128) and the color signal of the light passing through the diffuser under the current lightening condition is (200, 64, 64), the amount of color correction is (−72, 64, 64). The color correction (or calibration) can also be adjusted according to the different color sensitivity of the human eye; also, the calibration may be intentionally distorted (at the request of a user, e.g., make the scene more red). Further, the color correction can be performed to account for the difference in luminance. For example, the color may be corrected in an xyY color space (or other color spaces) so that the luminance and the chromaticity are adjusted separately. It is understood that various different algorithms known to the person skilled in the art can also be used to construct color mapping and perform correction.

Figure 12:
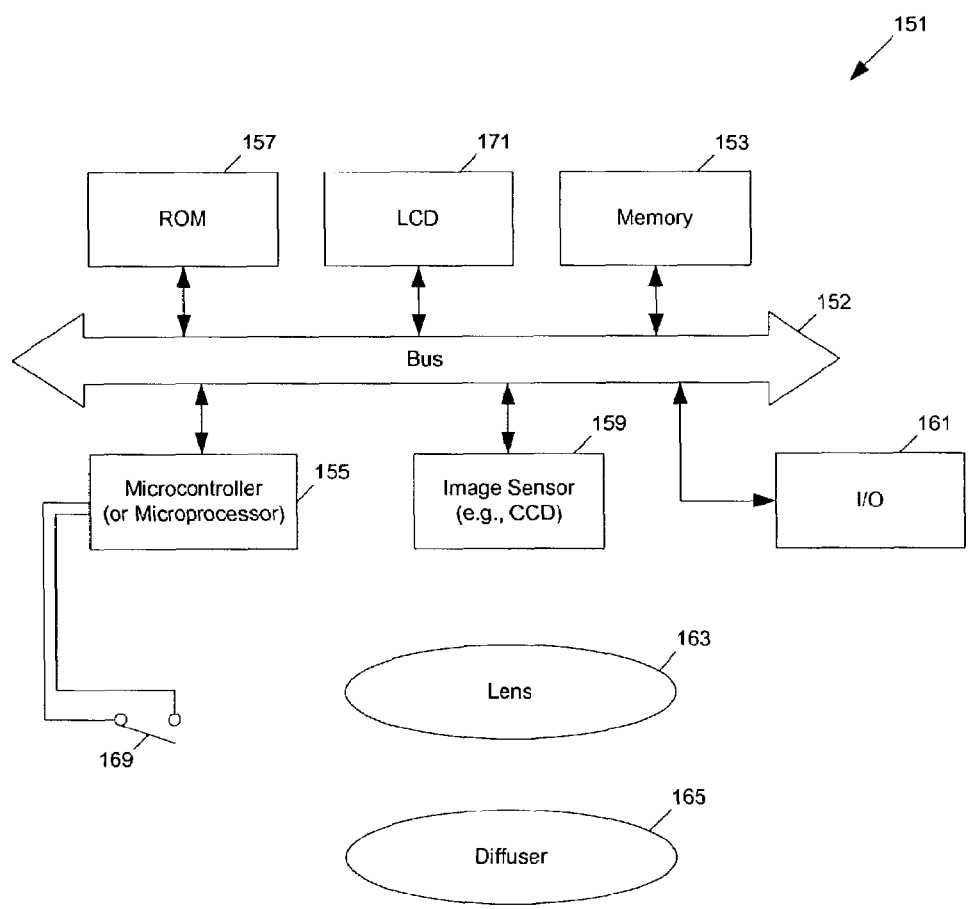
FIG. 12 shows an example of a camera system which may be used in embodiments of the invention.

FIG. 12 shows an exemplary embodiment of an imaging device 151 of the invention. This imaging device 151 may be, for example, a digital still or video (movie) camera. The imaging device 151 includes a microcontroller or microprocessor 155 which is coupled to a memory 153, an Input/Ouput (I/O) port 161, a CCD image sensor 159, and a ROM (Read Only Memory) 157 by a bus 152. The imaging device 151 may also include a Liquid Crystal Display (LCD) 171, which is also coupled to the bus 152 and which may be used to display images which are captured or recorded by the imaging device 151. The LCD 171 serves as a viewfinder of a camera and there may optionally be other types of image display devices on imaging device 151 which can serve as a viewfinder. The imaging device 151 also includes an imaging lens 163 and a diffuser 165 which can be disposed over the lens 163 and CCD 159 in order to provide diffuse lightening, from a scene which is to be captured/recorded, to the CCD 159. A switch 169, which is coupled to the microprocessor 155, determines whether or not the diffuser 165 is positioned in the light path from the scene to the CCD and causes a signal to be provided to the microprocessor 155 which indicates the position of the diffuser 165. The microprocessor 155 controls the operation of the imaging device 151; and, it may do so by executing a software program stored in ROM 157, or in the microprocessor 155, or in both ROM 157 and the microprocessor 155. The microprocessor 155 controls the collection of color correction information as a result of light passing from the scene through the diffuser to the CCD 159; and, it controls the storage of a captured image in memory 153. The microprocessor 155 also controls the exporting of image data (which may or may not be color corrected) to an external general purpose computer or special purpose computer through one of the I/O ports 161. The microprocessor 155 also responds to user commands (e.g., to take a picture or turn off the camera). The ROM 157 may store software instructions for execution by the microprocessor 155 and may also store color correction data which is used for white balance based on the known color of the diffuser. The memory 153 is used to store captured/recorded images which are received from the CCD 159. It will be appreciated that other alternative architectures of a camera can be used with the various embodiments of the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An imaging device, comprising:
a housing;
a first image sensor coupled to the housing;
a lens coupled to the housing, the lens being in front of the first image sensor to generate a first image of a scene on the first image sensor;
a second image sensor coupled to the housing, the second image sensor capable of generating a second image of the scene on the second image sensor; and
a diffuser coupled to the second image sensor to provide diffused light towards the second image sensor for the second image, wherein the second image sensor generates color signals for determining color correction information of the first image generated from the first image sensor, the diffuser is translucent and of a known color, and the color correction information is determined using the color signals and the known color of the diffuser, wherein the color correction information is determined using the color signals and recorded color signals, the recorded color signals being generated using a reference lighting environment.

2. An imaging device as in claim 1, further comprising:
a circuit coupled to the second image sensor, the circuit determining the color correction information using the color signals.

3. An imaging device as in claim 2, wherein the color correction information is used for white balance, and the color correction information is determined based on the scene.

4. An imaging device as in claim 2, wherein the color correction information is determined using the color signals and predetermined color information.

5. An imaging device as in claim 2, wherein the circuit is integrated with the second image sensor on a chip.

6. An imaging device as in claim 1, wherein the diffuser comprises a translucent flat member of a uniform color.

7. An imaging device as in claim 1, wherein the diffuser comprises a translucent dome member of a uniform color.

8. A method to perform color correction, the method comprising:
receiving, from a first image sensing device capable of generating a first image of a scene, first color signals for light passing through a translucent diffuser to provide the first image, the first color signals being determined by the first image sensing device in a first lighting environment, wherein the translucent diffuser is of a known color;
determining color correction information for the first lighting environment using the first color signals and the known color of the translucent diffuser; and
receiving second color signals determined by a second image sensing device in the first lighting environment, wherein the first and second image sensing devices are coupled to a camera and wherein the second image sensing device generates a second image of the scene to be color corrected using the color correction information, wherein the color correction information is determined using the first color signals and recorded color signals, the recorded color signals being generated using a reference lighting environment.

9. A method as in claim 8, further comprising:
performing color correction to the second color signals using the color correction information.

10. A non-transitory machine readable medium storing executable computer program instructions which when executed by a data processing system cause said system to perform a method to perform color correction, the method comprising:
receiving, from a first image sensing device capable of generating a first image of a scene, first color signals for light passing through a translucent diffuser of a known color to provide the first image, the first color signals being determined by the first image sensing device in a first lighting environment;
determining color correction information for the first lighting environment using the first color signals and the known color of the translucent diffuser; and
receiving second color signals determined by a second image sensing device in the first lighting environment, wherein the first and second image sensing devices are coupled to a camera and wherein the second image sensing device generates a second image of the scene to be color corrected using the color correction information, wherein the color correction information is determined using the first color signals and recorded color signals, the recorded color signals being generated using a reference lighting environment.

11. A medium as in claim 10, wherein the method further comprises:
performing color correction to the second color signals using the color correction information.

12. A data processing system to perform color correction, the data processing system comprising:
means for receiving, from a first image sensing device capable of generating a first image of a scene, first color signals for light passing through a translucent diffuser of a known color to provide the first image, the first color signals being determined by the first image sensing device in a first lighting environment;
means for determining color correction information for the first lighting environment using the first color signals and the known color of the translucent diffuser; and
means for receiving second color signals determined by a second image sensing device in the first lighting environment, wherein the first and second image sensing devices are coupled to a camera and wherein the second image sensing device generates a second image of the scene to be color corrected using the color correction information, wherein the color correction information is determined using the first color signals and recorded color signals, the recorded color signals being generated using a reference lighting environment.

13. A data processing system as in claim 12, further comprising:
means for performing color correction to the second color signals using the color correction information.

14. An image recording device, comprising:
a housing;
a first image sensor coupled to the housing, the first image sensor capable of generating a first image of a scene;

a diffuser coupled in front of the first image sensor to diffuse light towards the first image sensor to provide the first image, wherein the diffuser is translucent and of a known color; and a second image sensor coupled to the housing for capturing a second image of the scene, wherein the first image sensor generates color signals for determining color correction information for the image as a result of light passing through the diffuser, and the color correction information is determined using the color signals and the known color of the diffuser, wherein the color correction information is determined using the color signals and recorded color signals, the recorded color signals being generated using a reference lighting environment.

15. An image recording device as in claim 14, further comprising:

a circuit coupled to the first image sensor, the circuit determining the color correction information using the color signals.

16. An image recording device as in claim 15, wherein the circuit performs color correction using the color correction information for image signals generated by the second image sensor.

17. An image recording device as in claim 15, wherein the color correction information is used for white balance, and the color correction information is determined based on the scene being recorded by the imaging recording device.

18. An image recording device as in claim 15, wherein the color correction information is determined using the color signals and predetermined color information.

19. An image recording device as in claim 16, wherein the circuit is integrated with the second image sensor on a chip.

20. An image recording device as in claim 14, wherein the diffuser comprises a translucent flat member of a uniform color.

21. An image recording device as in claim 14, wherein the diffuser comprises a translucent dome member of a uniform color.

* * * * *